Patented Nov. 18, 1930

1,782,356

UNITED STATES PATENT OFFICE

PAUL LAEUGER, OF BASEL, SWITZERLAND, ASSIGNOR TO THE FIRM J. R. GEIGY S. A., OF BASEL, SWITZERLAND

MANUFACTURE OF ACID DYESTUFFS OF THE PHENONAPHTHOSAFRANINE SERIES

No Drawing. Application filed October 25, 1928, Serial No. 315,102, and in Germany November 14, 1927.

This invention relates to improvements in the manufacture of acid dyestuffs of the phenonaphthosafranine series of the kind described in U. S. specification Ser. No. 166,021. filed February 4, 1927.

By the present invention valuable blue to violet acid-dyestuffs of the phenonaphthosafranine series are obtained when there are used as parent material, instead of isorosinduline derivatives containing an aryl-residue attached to the pentavalent nitrogen (the so-called mesoazine-nitrogen), a phenonaphthoazonium derivative containing, instead of this aryl-residue, an alkyl or substituted alkyl residue and corresponding with the probable general formula:

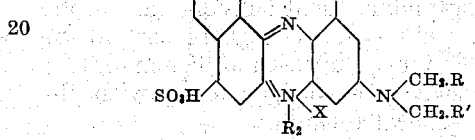

wherein R and R' represent hydrogen, alkyl or aryl, $R_2$ represents an alkyl- or substituted alkyl-group and X an acid radical, and wherein the position 1 is preferably occupied by a sulphonic acid group, whilst the positions 2, 8, 9, 10 may also be occupied by a sulphonic acid group or by a monovalent radical, such as hydroxyl, alkyloxy, methyl, acidylamino or halogen.

In carrying out the invention these phenonaphthazonium derivatives, which are in themselves valueless as dyestuffs, are caused to react with unsymmetrical N-alkylated para-phenylene-diamine-sulphonic acids in which the sulphonic acid group occupies the ortho-position to the primary amino-group. In this reaction the labile 6-sulphonic acid group of the phenonaphthazonium derivative is replaced by the phenylene-diamine residue and there are formed new phenonaphthosafranine dyestuffs corresponding with the probable general formula:

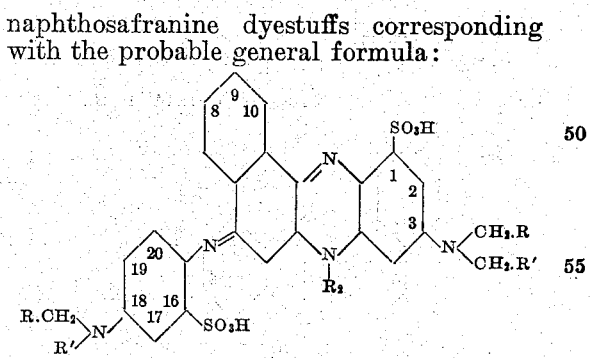

(R, R' and $R_2$ having the meaning hereinbefore defined) and containing a sulphonic acid group in the 16-position, this 16-sulphogroup being important for the fastness of the dyestuffs.

It is surprising that the dyestuffs which can be made by the present invention have excellent properties with respect to their fastness to alkalies and light, for it was to be expected that by replacing the mono-aryl-2 naphthylamines used for making the isorosinduline by the more strongly basic monoalkylated-2-naphthylamines, the alteration in the basicity of the dyestuffs would have an appreciable influence upon their properties. Of particular importance is the fact that the invention permits the production from unsymmetrical alkyl substituted para-phenylene-diamine derivatives of dyestuffs for wool which are fast to alkali and to light and dye blue to violet shades, whereas the corresponding dyestuffs described for example in the aforesaid specification yield greenish-blue to blue dyeings.

The mesoalkylisorosinduline-6-sulphonic acids used as parent material for the invention may be made from mono-alkylated-2-naphthylamines or derivatives thereof by the known methods of making azines, with subsequent treatment with sodium sulphite according to German specification No. 102,458. Among the alkyl-substituted 2-naphthylamines which are applicable there may be mentioned: 2-naphthylamino-acetic acid-methyl ester or its homologues; hydroxy-ethyl-2-naphthylamine or its homologues and monoalkyl-2-naphthylamines; sulphonic acids of the aforesaid bases containing the sulpho-group in the 6- or 7-position may also be used.

The following examples illustrate the invention, the parts being by weight:—

*Example 1.*—In order to prepare a dyestuff of the formula:

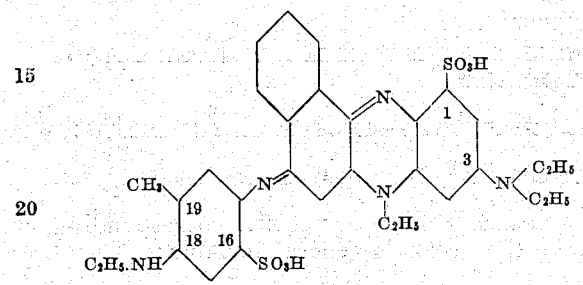

32 parts of the azine sulphonic acid of the formula:

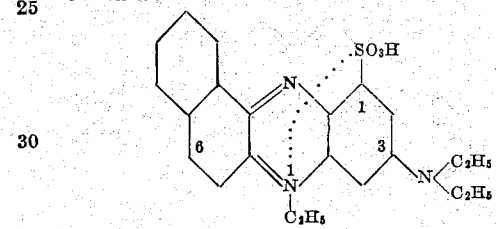

obtainable by condensation of mono-ethyl-2-naphthylamine with the azo-dyestuff 2:5-dichloro-benzene-azo-diethyl-metanilic acid, are converted into the 1:6-disulphonic acid derivative by the process described in German specification No. 102,458; the product is thereupon condensed by boiling in a reflux apparatus with 23 parts of 1-methyl-2-ethyl-amino-5-aminobenzene-4-sulphonic acid dissolved in the theoretical quantity of sodium carbonate solution. It is advantageous to add 20 parts of crystalline sodium acetate. When the reaction is complete the dyestuff is precipitated by means of common salt, separated and worked up. It is a dark powder, soluble in water to a blue-violet solution and in concentrated sulphuric acid to a green solution. In an acid bath it dyes animal fibres reddish blue shades of good fastness to light and alkalies.

*Example 2.*—A dyestuff of the formula:

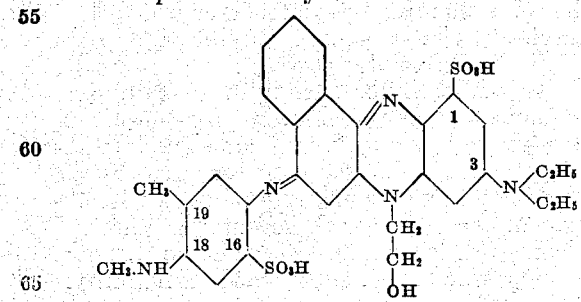

is obtained by using in the process described in Example 1, instead of mono-ethyl-2-naphthylamine an equivalent quantity of hydroxy-ethyl-2-naphthylamine, the azine-1:6-disulphonic acid obtained in a manner analogous to that described in Example 1 being condensed in boiling aqueous solution with 21.6 parts of 1-methyl-2-methylamino-5-amino-benzene-4-sulphonic acid in the form of its sodium salt. The dyestuff is a dark coloured crystalline powder which dissolves in water to a blue solution and in sulphuric acid to a green solution. In an acid bath it dyes wool beautiful blue shades which are distinguished by good fastness to light and complete fastness to alkali.

In this example, by using instead of hydroxy-ethyl-2-naphthylamine an equivalent quantity of 2-naphthylamino-acetic acid ethyl-ester, there is obtained a dyestuff of similar properties dyeing somewhat redder shades.

What I claim is:—

1. A process for the manufacture of acid dyestuffs fast to alkali of the phenonphthosafranine series, consisting in condensing an unsymmetrical N-alkylated para-phenylenediamine-sulphonic acid having a sulpho group in ortho-position with respect to the primary amino-group with a phenonaphthazonium sulphonic acid having an alkyl group attached to the mesoazine-nitrogen atom.

2. A process for the manufacture of acid dyestuffs fast to alkali of the phenonaphthosafranine series, consisting in condensing an unsymmetrical N-alkylated para-phenylenediamine-sulphonic acid having a sulpho group in ortho-position with respect to the primary amino-group with a phenonaphthazonium derivative corresponding with the probable general formula:

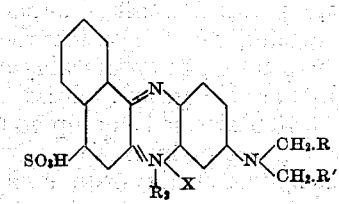

wherein R and R' represent hydrogen, alkyl or aryl, $R_2$ represents an alkyl- or substituted alkyl-group and X an acid radical.

3. A process for the manufacture of acid dyestuffs fast to alkali of the phenonaphthosafranine series, consisting in condensing an unsymmetrical N-alkylated para-phenylenediamine-sulphonic acid having a sulpho group in ortho-position with respect to the primary amino-group with a phenonaphthazonium disulphonic acid corresponding with the probable general formula:

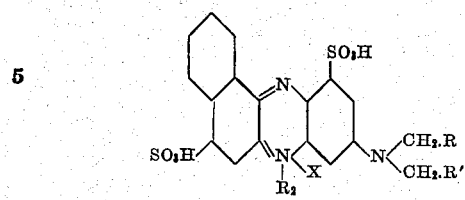

wherein R and R' represent hydrogen, alkyl or aryl, $R_2$ represents an alkyl- or substituted alkyl-group and X an acid radical.

4. A process for the manufacture of acid dyestuffs fast to alkali of the phenonaphthosafranine series, consisting in condensing the 1:6-disulphonic acid of the product of condensation of mono-ethyl-2-naphthylamine and 2:5-dichloroaniline-azo-diethyl-metanilic acid with 1-methyl-2-ethylamino-5-aminobenzene-4-sulphonic acid.

5. As new articles of manufacture, the acid dyestuffs above referred to of the phenonaphthosafranine series, obtained by condensing the 1:6-disulphonic acid of the product of condensation of mono-ethyl-2-naphthylamine and 2:5-dichloro-benzene-azo-diethyl-metanilic acid with 1-methyl-2-ethylamino-5-aminobenzene-4-sulphonic acid, said dyestuffs having the formula

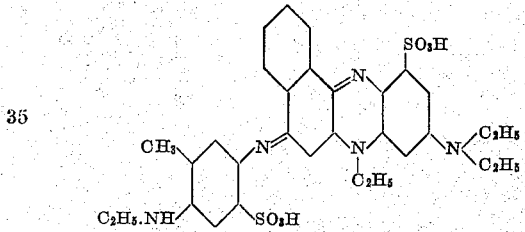

and constituting in form of their sodic salts a dark powder soluble in water to a blue-violet solution and in concentrated sulphuric acid to a green solution and giving on animal fibres blue to violet tints fast to alkali and light.

In witness whereof I have hereunto signed my name this 15th day of October, 1928.

PAUL LAEUGER.